FIG.I.

April 15, 1952     E. A. FAILMEZGER     2,592,528
FILTER

Filed April 1, 1947     3 Sheets-Sheet 2

INVENTOR.
EUGENE A. FAILMEZGER
BY
ATTORNEYS.

April 15, 1952  E. A. FAILMEZGER  2,592,528
FILTER
Filed April 1, 1947  3 Sheets-Sheet 3

INVENTOR.
EUGENE A. FAILMEZGER
BY
Blair, Curtis & Hayward
ATTORNEYS.

Patented Apr. 15, 1952

2,592,528

UNITED STATES PATENT OFFICE 2,592,528

FILTER

Eugene A. Failmezger, Syracuse, N. Y., assignor to U. S. Hoffman Machinery Corporation, Syracuse, N. Y., a corporation of Delaware Application April 1, 1947, Serial No. 738,624

5 Claims. (Cl. 210—181)

This invention relates to filters, and more in particular to disc filters of the type which are used for filtering lubricating oil in an engine.

The present invention relates to the copending application of Francis J. Armstrong, filed December 7, 1945, Serial No. 633,343. An object of this invention is to provide a filter which is light in weight, sturdy in construction, inexpensive to manufacture and maintain, and which is readily adaptable for use under a wide variety of conditions. A further object is to provide a filter of the character disclosed in the above-identified copending application which will be particularly suitable for mass production. These and other objects will be in part obvious and in part pointed out below.

The invention accordingly consists in the features of construction, combinations of elements, and arrangements of parts as will be exemplified in the structure to be hereinafter described and the scope of the application of which will be indicated in the following claims.

Figure 1:
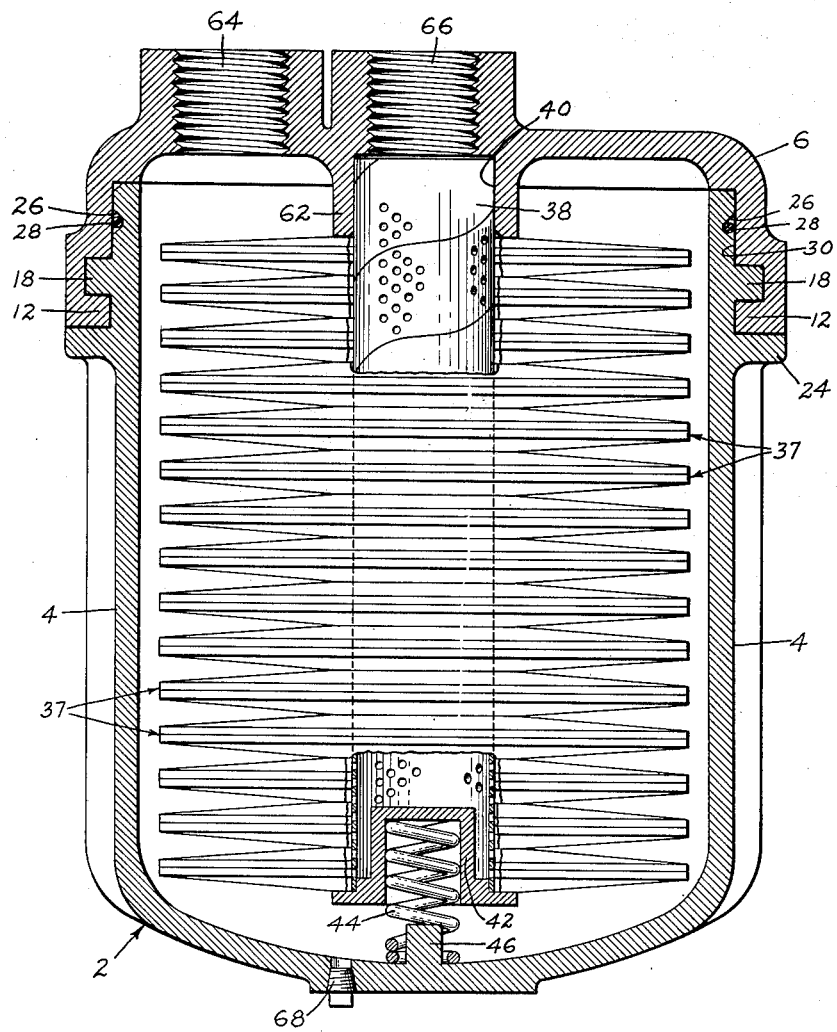
Figure 1 is a vertical section of a filter unit constituting one embodiment of the invention.
Figure 3:
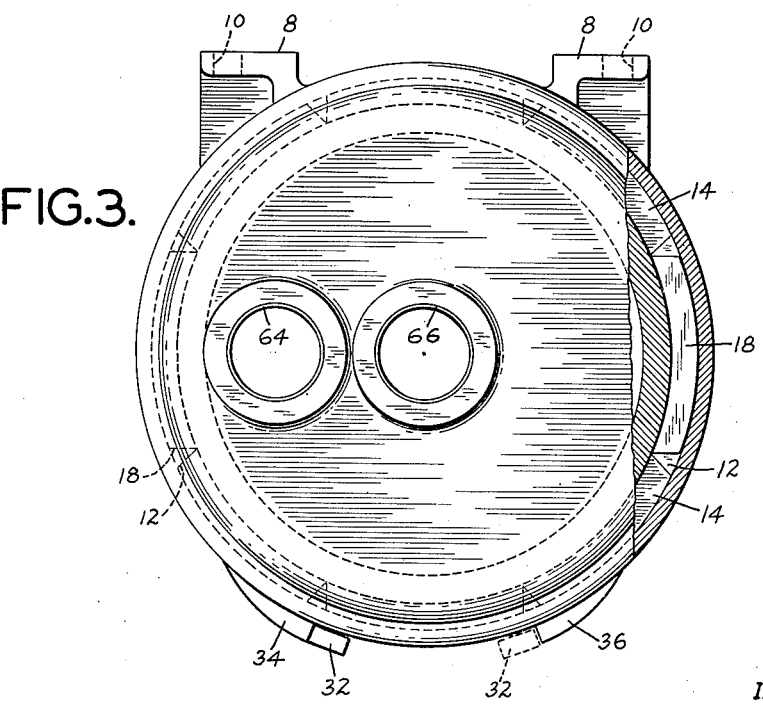
Figure 3 is a top plan view.
Figure 4:
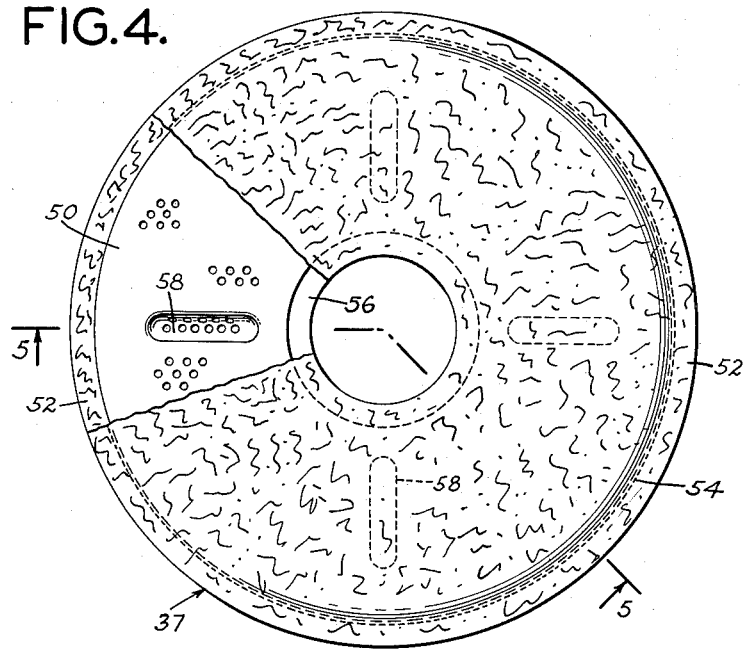
Figure 4 is a plan view of one of the filter discs.

Referring particularly to Figures 1 and 3 of the drawings, a cylindrical casing 2 is formed by a main casing 4 and a top or lid portion 6. The lid portion provides the mounting for the filter unit and for this purpose (see Figure 3) there are two angle brackets 8 integral with the lid portion. These brackets are provided with holes 10, shown in broken lines, through which stud bolts (not shown) extend and are threaded into the base of the machine to which the filter unit is attached.

Casing 4 is attached to lid portion 6 by interengaging flanges on the two members; accordingly, lid portion 6 has four flanges 12, each of which has an arcuate extent of approximately 45°. Flanges 12 are separated from each other by slots 14 and above the flanges is an annular groove 16. Casing 4 has on its upper end a similar mating structure formed by four arcuate flanges 18 separated by slots 20 and having beneath them an annular groove 22 and a flange 24.

The top of the casing has a peripheral groove 26 in which is positioned a rubber sealing ring 28 which cooperates with a cylindrical surface 30 in the lid portion.

In assembling the casing to the lid portion, the upper end of the casing is inserted into the lid portion with flanges 18 positioned in alignment with slots 14; and, the arrangement is such that these flanges pass snugly through the slots into the annular groove 16, and flanges 12 pass through slots 20 into groove 22. With the casing thus positioned, it is rotated through an angle of 45°, with the result that each of flanges 18 rides over the top of a flange 12. At this time, sealing ring 28 is spread by engagement with surface 30 so as to provide a seal, and the interengagement of the parts is such that a snug fit is provided and the casing 4 is securely held in place.

Figure 2:
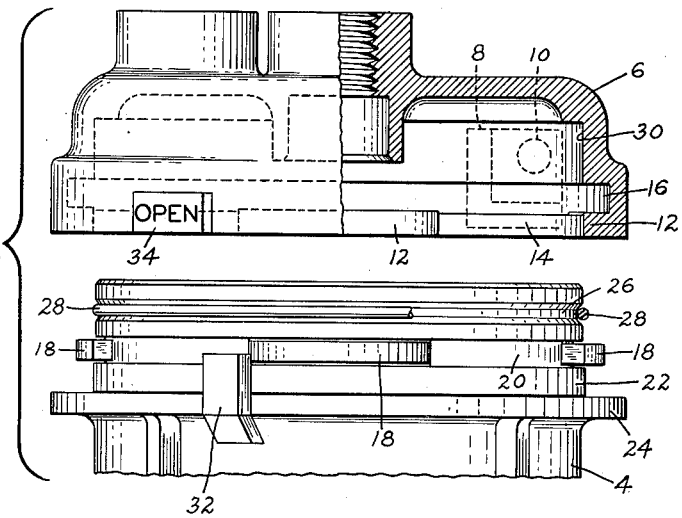
Figure 2 is an exploded view of the upper portion of the casing construction showing the casing proper removed from the top or lid portion.

Casing 4 carries an upwardly projecting bracket 32 (Figures 2 and 3) which is carried by the outer edge of flange 24, and lid portion 6 carries a pair of stop lugs 34 and 36. When the top of the casing is being inserted into the lid portion, bracket 32 is positioned as shown in Figure 3 adjacent lug 34, and when so positioned the flanges are in alignment with the respective grooves as explained above. Then when the casing is fully inserted into the lid portion, it is rotated counter-clockwise (Figure 3) so as to bring bracket 32 against lug 36. This movement is sufficient to position each of flanges 18 directly over its flange 12 as explained above. Thus a sealed casing is provided which is readily assembled and which is readily taken apart by merely rotating casing 4 clockwise, so that bracket 32 is against lug 36, and then pulling downwardly.

Positioned within casing 2 is a set of filter elements 37, illustratively fifteen in number, which are positioned on a perforated sheet metal mandrel 38. As shown near the top of Figure 2, mandrel 38 is snugly received at one end in a bore 40 in lid portion 6, and the other end the mandrel is resiliently held by a cup 42 and a compression spring 44. This spring rests against casing 4 and fits over a lug 46 integral with the casing.

Figure 5:
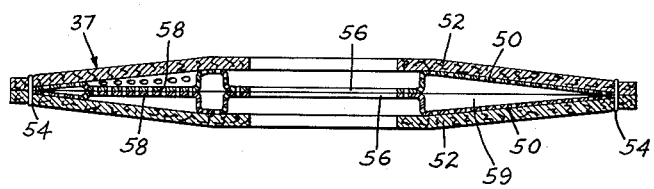
Figure 5 is a sectional view on the line 5—5 of Figure 4.

As shown best in Figure 5, each of filter elements 37 is formed by two identical oppositely disposed metal discs 50 and two enclosing felt discs 52 which are stitched together at the periphery at 54 and are held in spaced relationship by the discs. The main portion of each disc 50 is frusto-conical, but at the center the discs are offset toward each other to the plane of the outer periphery of the discs to provide mating flanges 56. Furthermore, each disc has four radial reinforcing bosses 58 which extend to the plane of flanges 56 and the peripheral edges of the discs. Thus, the two discs contact each other at their inner and outer peripheries and at bosses 58 so as to provide an annular space 59 therebetween. This space is wedge-shaped in radial cross-section with the narrow portion at the outer edge.

Referring now to Figure 1, the filter elements 37 are held in alignment by mandrel 38; and, the mandrel is permitted slight axial movement so that spring 44 exerts pressure through the peripheral flange of cup 42 against the lower filter element so as to compress the stack of filter elements against the sleeve 62 around arbor 40. The filter elements are held rigidly at their inner peripheries with the adjacent annular portions of the felt discs 52 contacting one another. The force exerted by spring 44 is sufficient to prevent the passage of contaminated oil between the filter elements so that an oil seal is provided. The unfiltered lubricating oil enters the top of the filter unit through a pipe connection at a threaded bore 64 and the filtered oil is withdrawn through a pipe connection at a similar threaded bore 66 in alignment with mandrel 38. The filter unit is normally mounted in the upright position shown, and the bottom of casing 2 is a drain plug 68 by which the filter unit may be drained.

Each filter element presents two frusto-conical filter surfaces formed by felt discs through which the oil passes into the annular space 59, and in passing through the felt disc the oil is filtered. The perforated discs 50 provide ample support for the felt discs but yet they permit the free passage of the oil into space 59. Within space 59 the oil passes radially inwardly toward mandrel 38, and at the disc flanges 56 the oil again passes through perforations in the discs and it then enters the mandrel through the perforations therein. Thus, the unfiltered oil passing into casing 2 is filtered by the passage through a single layer of felt and the filtered oil is drained to the mandrel. The filter unit presents a filter area to which the unfiltered oil has access, which is substantially the entire area of all of the felt discs, and the filtered oil is drained in an efficient manner from the entire surface of the opposite side of each of these felt discs. Therefore, a relatively large volume flow may be obtained with a minimum pressure drop and with minimum danger of stoppage.

As many possible embodiments may be made of the above invention and as many changes might be made in the embodiment set forth, it is to be understood that all matter hereinbefore set forth, or shown in the accompanying drawing, is to be interpreted as illustrative and not in a limiting sense.

I claim:

1. In a filter unit, the combination of, a casing construction formed by a lid portion and a shell portion which have interengaging open lugs which may be disengaged by rotating the shell portion with respect to the lid portion, a stop assembly comprising a pair of spaced stops on said lid portion and a single bracket on said shell portion which is adapted to be positioned between said stops and is adapted to limit the turning movement of the shell portion with respect to the lid portion, said lid portion having a central outlet opening and a side inlet opening, a perforated sleeve mandrel coaxially positioned with respect to said outlet opening, a plurality of disc filter elements positioned on said mandrel, and a retaining cup and spring assembly projecting into said mandrel at the end thereof opposite said outlet opening and compressing said filter elements at their inner peripheries.

2. A filter unit as described in claim 1 wherein said interengaging lugs on the casing portions include four peripheral lug portions on each of the portions which are adapted to be positioned in interengaging relationship when the shell portion is in one extreme position and which are out of engagement with each other when the shell portion is in its other extreme position as limited by said stop assembly.

3. In a filter unit, a casing formed by a main cylindrical shell portion which is closed at one end and open at the other end and a cover portion which mates with and closes said open end, said cover portion having a collar which snugly receives the open end of said shell portion, said shell portion having a peripheral groove in the outer surface thereof, a sealing ring positioned in said peripheral groove and forming a seal between said open end and the cover portion, said collar having an internal groove formed by a flange assembly including a plurality of circumferentially spaced arcuate flanges having slots therebetween, said shell portion having a plurality of arcuate lugs corresponding in number to the number of said slots and adapted to pass through said slots into said groove as the open end of the cylindrical shell portion is projected into said collar, said lugs being adapted to be snugly received in said groove and cooperating with other parts of the casing to form a rigid interengaging relationship with said flange assembly, a stop assembly to limit the relative movement between said shell portion and said cover portion, means for introducing liquid to be filtered into said casing, and means for withdrawing the filtered liquid from the casing.

4. A filter unit construction as described in claim 3 of the type wherein a plurality of filter elements are used, and means to hold the filter elements in axial alignment comprising, a flanged cup engaging the end filter element adjacent the closed end of the shell portion with its flange overlying the inner annular portion of the adjacent filter disc, and a compression spring pressing at one end against said cup and at the other end against said shell portion thereby to hold the filter elements in sealing relationship and also to urge said shell portion away from said cover portion.

5. In a leaf-type filter unit, a casing comprising, a cylindrical shell portion which is closed at one end and open at the other end, and a lid portion adapted to mate with and close said open end of said shell portion, said shell and lid portions having a plurality of interengaging open lugs which may be engaged and disengaged with each other by relative rotation of said shell and lid portions, and a stop structure to limit said rotation; a filter assembly within said shell portion comprising a perforated sleeve mandrel, and a plurality of disc filter elements positioned on said mandrel; a retaining spring assembly comprising a compression spring, a cup for one end of said mandrel adapted, together with positioning means on the inner surface of the closed end of said shell to position the ends of said spring therebetween, to seal the ends of said mandrel and to force said discs into sealed relationship at their inner peripheries, whereby liquid to be filtered can enter said mandrel only by passing through said filter discs; and means for introducing liquid to be filtered into said casing and for withdrawing filtered liquid from said sleeve mandrel.

EUGENE A. FAILMEZGER.

REFERENCES CITED

The following references are of record in the file of this patent:

UNITED STATES PATENTS

| Number | Name | Date |
|---|---|---|
| 1,365,167 | Gates | Jan. 11, 1921 |
| 1,804,512 | Pickard | May 12, 1931 |
| 1,989,795 | Fellows | Feb. 5, 1935 |
| 2,057,932 | Bolser | Oct. 20, 1936 |
| 2,304,618 | Williams | Dec. 8, 1942 |
| 2,368,795 | Wittenberg | Feb. 6, 1945 |
| 2,427,320 | Zech | Sept. 9, 1947 |
| 2,430,078 | Reinsch et al. | Nov. 4, 1947 |
| 2,491,144 | Yankovitch | Dec. 13, 1949 |